United States Patent [19]
Goyal et al.

[11] Patent Number: 5,219,471
[45] Date of Patent: Jun. 15, 1993

[54] REMOVAL OF METALS AND WATER-INSOLUBLE MATERIALS FROM DESALTER EMULSIONS

[75] Inventors: Shri K. Goyal, Naperville; James F. Mosby, Burr Ridge; Jack E. Treadman, II, St. Charles, all of Ill.

[73] Assignee: Amoco Corporation, Chicago, Ill.

[21] Appl. No.: 790,456

[22] Filed: Nov. 12, 1991

[51] Int. Cl.⁵ ............................................. B01D 17/06
[52] U.S. Cl. .................................... 210/787; 204/188; 204/190; 208/179; 208/182; 208/188; 209/144; 209/211; 210/512.1
[58] Field of Search ..................... 210/787, 512.1, 175; 204/188, 190, 302; 209/144, 211; 208/179, 181, 182, 187, 188

[56] References Cited
U.S. PATENT DOCUMENTS

| | | | |
|---|---|---|---|
| 2,380,458 | 7/1945 | Nees et al. | 204/190 |
| 3,923,643 | 12/1975 | Lewis et al. | 208/187 |
| 3,951,771 | 4/1976 | Burger | 204/190 |
| 4,116,790 | 9/1978 | Prestridge | 204/188 |
| 4,722,781 | 2/1988 | Swartz et al. | 208/188 |

Primary Examiner—Robert A. Dawson
Assistant Examiner—David Reifsnyder
Attorney, Agent, or Firm—Scott P. McDonald; Richard A. Kretchmer; Frank J. Sroka

[57] ABSTRACT

A process for measuring and treating oil-water stable emulsions derived from crude oil desalters is provided. Emulsion volume is measured, the emulsion is withdrawn, blended with aromatic-rich hydrocarbon, heated and three phases—water, oil and solids—are separated by exposure to a force of at least 500 g.

8 Claims, 2 Drawing Sheets

REMOVAL OF METALS AND WATER-INSOLUBLE MATERIALS FROM DESALTER EMULSIONS

BACKGROUND OF THE INVENTION

Electrostatic desalting of crude oil has been practiced for many years. Desalting is necessary prior to further processing to remove salts and to prevent deposition of materials suspended in the oil in lines and processing equipment. While this was a relatively troublefree procedure in the past, several factors have necessitated the development of improved processes.

The character of raw crude oil from many sources is changing because of lowering levels of oil fields which results in the delivery of heavier crudes. Chemicals added during oil recovery further add to the problem.

More stringent regulatory requirements have increased the attractiveness of improved procedures. Water quality is monitored by regulatory authorities and all materials, except oil, discharged from desalting processes are listed waste.

In the typical desalter process, crude oil is mixed with water, demulsifiers and anionic materials. The mix is passed into a desalter assembly where it is exposed to an applied electrical field causing an induced dipole to be formed in each water droplet which causes electrostatic coalescence of the water droplets which have suspended particles including metals such as iron. The metals to some extent combine with the anionic additives and form aqueous insoluble salts and these, together with other agglomerated particulates, fall into the heavier aqueous phase. The streams of desalted crude oil and aqueous waste are separately discharged from the desalter.

A persistent problem, however, results from the presence of a stable emulsion which forms at the interface of the oil and the aqueous phase in the desalter. This rag or cuff layer collects drilling mud, water insoluble salts of many metals particularly iron, production chemicals, silt and the like. When the cuff layer becomes enlarged, capacity of the desalting apparatus is reduced, while operating problems such as arcing across the electric grid may result.

Many desalting modifications have been introduced in efforts to break the interface emulsion and obtain clean splits between the oil and the aqueous phase. U.S. Pat. No. 4,722,781 teaches recycling of a major portion of the interface into incoming crude oil to break the emulsion, with a small portion of the emulsion being separated and diluted with several volumes of light hydrocarbon such as kerosene or naphtha. This approach presents several problems. The bulk of the solids in the interface are added back into the incoming crude oil to increase the level of contamination; and the diluent, being at least 3 to 10 times the volume of cuff material, requires increased equipment capacity.

U.S. Pat. No. 4,116,790 addresses the problem of process limitations experienced in separating oil-water mixtures. This process consists of applying an electric field to coalesce small liquid drops into much larger drops, followed by centrifugation of the entire mixture to speed separation. No suggestion of what magnitude of "g" forces needed are described, the disclosure stating only that the forces be great enough to speed separation but not so great as to refragment the droplets. This process is not concerned with the interface emulsion formed after application of the electric field, and which persists after separation of the coalesced material from the oil phase, as the entire mix is centrifuged. Centrifuging the entire crude oil stream is highly inefficient and costly an separation of any emulsion present is poor.

U.S. Pat. No. 3,923,643, concerned with reprocessing of used lubricating oil, induces agglomeration of suspended solids by flashing off water and light hydrocarbons followed by holding the treated heavy oil at a temperature of 500° to 700° F. for 1 to 12 hours. This method is directed only to removal of heat-agglomerated solids and not to the interface formed during desalting of virgin crude oil which is resistant to separation.

Another process for treating used lubricating oils is taught by U.S. Pat. No. 4,250,021. This utilizes addition of surfactant to oxalate, chromate, phosphate and sulfate anions to form metal insoluble salts while inhibiting formation of an emulsion. After treatment the entire batch of treated oil is passed through a centrifuge.

While these prior art methods are useful in limited applications they do not satisfy the present need for a more efficient process.

SUMMARY OF THE INVENTION

An improved process for removing metals and insoluble materials from crude oil is provided. The process comprises the steps of blending crude oil with water and desalting chemicals, conveying the blend to the chamber of an electrostatic desalter where it is passed through an electrical field to cause agglomeration of suspended insoluble materials, facilitating the formation of layers of clean oil, brine and oil-brine interface emulsion. The oil and brine are continuously withdrawn in separate streams.

Volume of the emulsion layer is measured, withdrawn and blended with up to about two volumes of aromatic-rich hydrocarbon. Selection of the hydrocarbon is critical in obtaining clean separation between oil water and suspended solids in the emulsion. The emulsion blend is maintained at a temperature of about 100° to 300° F. and at a positive pressure, preferably up to 300 psi to maintain it in the liquid phase, while the blend is subjected to a force of at least 500 g, most preferably at from about 900 to 10,000 g, whereby desalted oil free of at least 90% of suspended metal and other particulates is separated from the aqueous phase of the emulsion.

The term "aromatic-rich" as used herein means organic compounds containing more than 20% by weight of closed carbon ring structures as determined by nuclear magnetic resonance (NMR) detection of $sp^2$ orbital bonds.

The term "g" as used herein is the unit of force equal to the force exerted by gravity on a body at rest and is used to indicate the force to which the body is subjected when accelerated.

The term "API Gravity" as used herein is the gravity of a material at 60° F. as calculated by the following formula:

$$\text{API Gravity} = \frac{141.5}{\text{sp. gr. } 60/60° \text{ F.}} - 131.5$$

A more detailed description of the invention is given in the following specification sections and appended claims, taken in conjunction with the accompanying drawings.

DETAILED DESCRIPTION OF PREFERRED EMBODIMENTS

Figure 1:
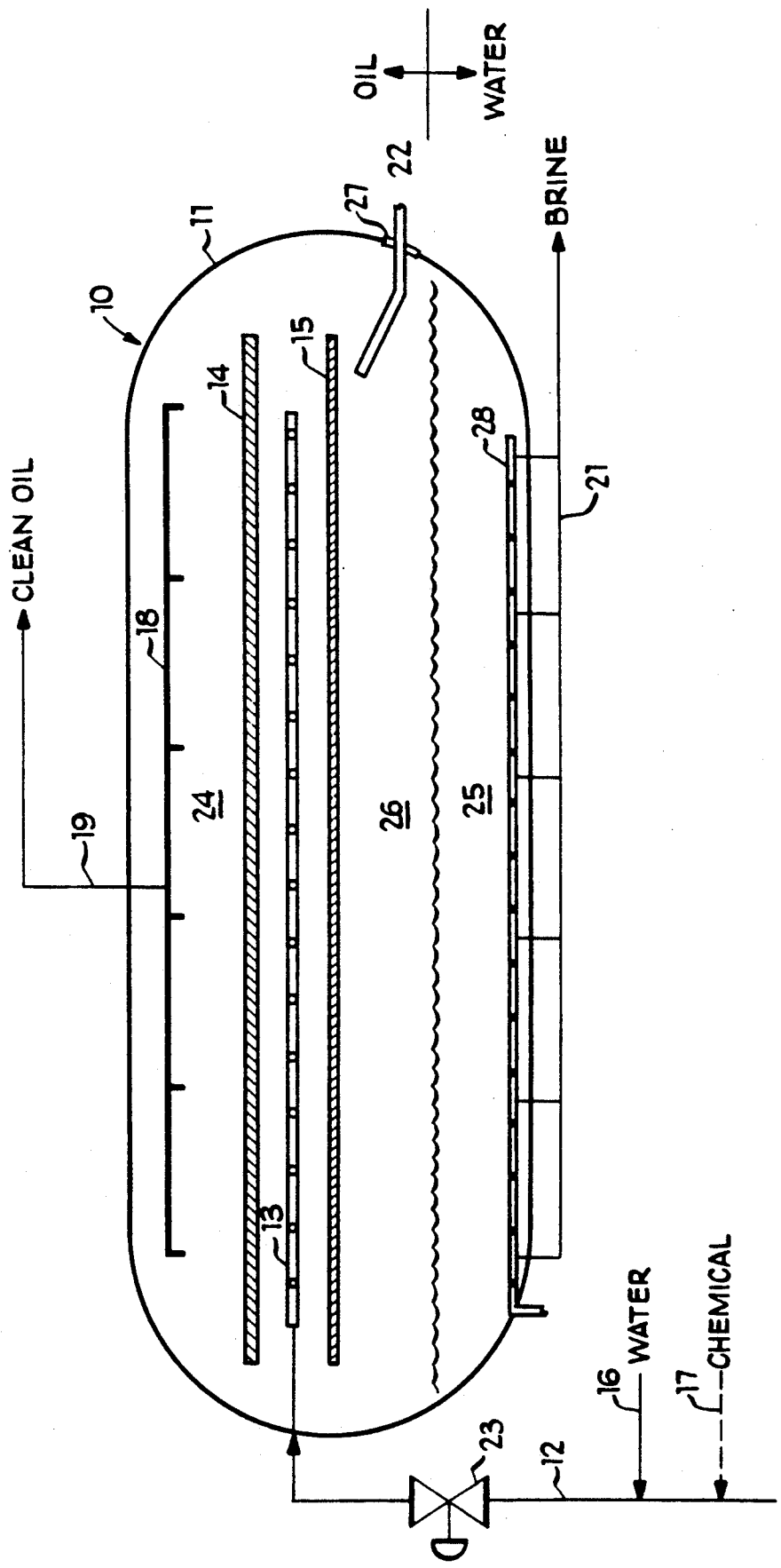
FIG. 1 is an elevational cross-sectional view of one embodiment of an electrostatic desalting apparatus employed in the practice of this invention.

FIG. 1 illustrates the initial portion of the process. Virgin or raw crude oil is pumped through line 12 past mix valve 23 into the desalting chamber 11 of desalter assembly 10. Before entry into the chamber water is added through line 16 and desalter chemical through line 1 into the oil stream. Distribution line 13 spreads the crude oil and water mixture between upper electrode 14 and lower electrode 15 which when energized form an electric field through which the mix passes. Suspended materials coalesce under the influence of the field. The applied electric field causes an induced dipole to be formed in water droplets contained within the mix which results in attraction between them to yield clumping of insoluble particles.

Agglomerates and water from the mix drop downward to form a brine layer 25 in the lower portion of chamber 11. Desalted or clean oil rises to form layer 24 at the upper part of the chamber. Clean oil is continuously removed through outlet line 19 and brine is also continuously removed through bottom line 21 for disposal. Mud collecting on the chamber bottom is washed at intervals by passing steam or water through blow line 28 to suspend the sediment for disposal with brine through 21.

At the interface of the oil and brine layers emulsion 26 is formed. Depending on the burden of suspended particulates carried by the crude oil this persistent layer may grow in volume to decrease the capacity of the equipment and to contact electrode 15 and cause electrical arcing. Measurement of the emulsion is conducted periodically by means of swing arm 27 which is positioned within housing 27 carried on chamber 11 sidewall so as to be rotatable through the chamber wall. Withdrawal of samples while rotating the swing arm provides measurement of the depth of layer 26. An emulsion gathering means, as shown in FIG. 2, may be positioned to cooperate with the swing arm to withdraw quantities of emulsion as needed.

Figure 2:
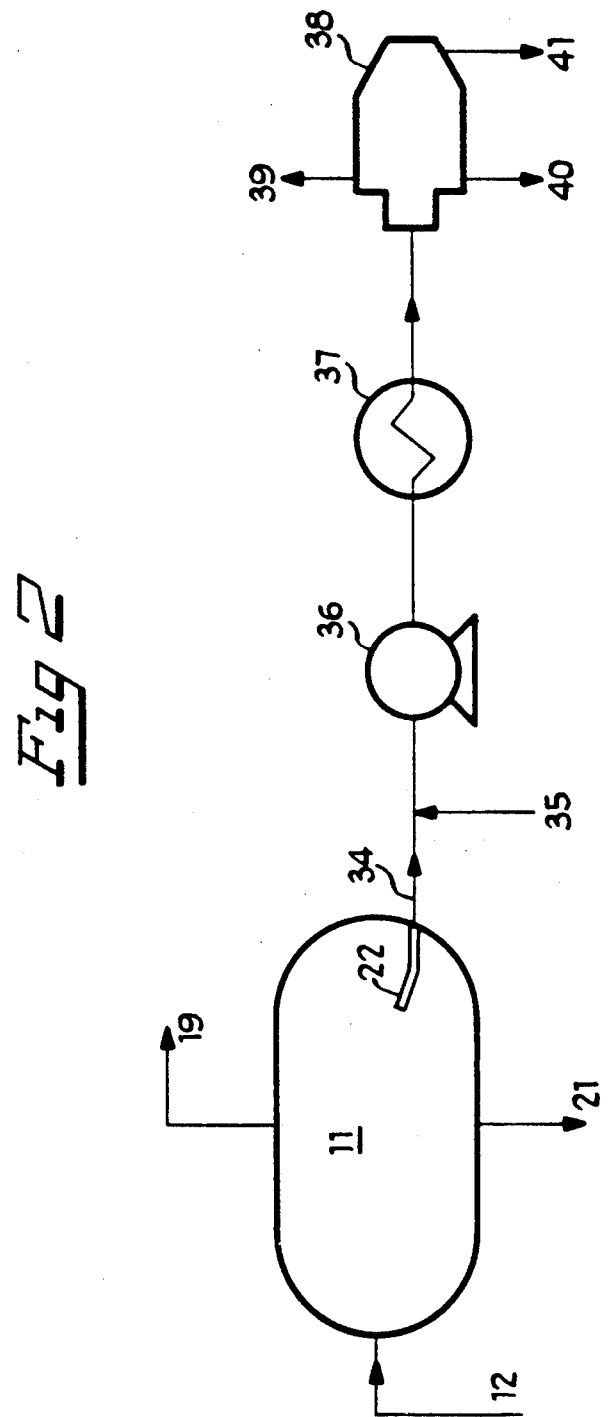
FIG. 2 is a schematic of a preferred embodiment of the overall process of the invention.

FIG. 2 depicts the overall process sequence. Crude oil is introduced into desalter chamber 11 by inlet line 12, desalted oil is drawn off by outlet line 19 and brine exits by line 21. Swing arm 22 communicates with emulsion outlet line 34. Also communicating with line 3 is emulsion gathering tube 42 positioned within the brine layer which serves to facilitate withdrawal of emulsion for treatment when required. After measurement of an excessive level of emulsion is made, emulsion is withdrawn by gathering tube 42 from the desalter assembly and then through line 34 where it is blended with aromatic-rich hydrocarbon passing through line 35. Useful proportions range from about 0.1 to 2.0 parts of the hydrocarbon blended with emulsion. The blend passes first through pump 36 supplying the limited pressure which may be required by the process to avoid vaporization and then through heat exchanger 37 which maintains the necessary temperature of the blend during demulsification and separation.

The hot blend under pressure is passed into separator 38 where the blend is exposed to suitable g forces to cause separation of water that is then removed through heavy phase outlet 39, oil is collected from light phase outlet 40 and concentrated solids removed through outlet 41.

In practicing the process of the present invention, raw crude oil is mixed with various additives. In addition to water, chemicals supplying anions that form aqueous-insoluble salts with metals present in the oil and demulsification agents are included. The mixture is then passed through an electrical field within the chamber of a desalting assembly which coalesces or agglomerates small droplets of suspended material that fall into a bottom aqueous brine layer. The electrodes are energized in the range of about 10 to 20 kilovolts. The oil then freed of suspended rust, silt, drilling mud components and the like is drawn off while the brine layer is separately removed from the apparatus.

The problem to which this invention is addressed concerns clean separation of the stable interface emulsion formed between the layers of oil and the brine or effluent water. This cuff or rag emulsion layer contains metals not removed by desalting such as aluminum, nickel, vanadium, iron, copper, barium and sodium. Continuing presence of these materials during further processing causes them to be concentrated, for example, in atmospheric or vacuum resids, which then leads to their being deposited on resid hydrotreater or fluid catalytic cracker unit catalysts to cause deactivation or to their concentration in coke end products which is detrimental to quality.

A typical desalter emulsion contains about 20% oil, 65% water and about 15% solids. It is withdrawn from the desalter assembly, blended with a limited amount of aromatic-rich hydrocarbon, preferably about 1 to 2 volumes, while being maintained at a temperature of about 100° to 300° F. and at a positive pressure of about 1 to 300 pounds per square inch (psi). It is critical to employ hydrocarbons that have a substantial content of aromatic components in order to obtain clean separation of oil from water and solids in the emulsion. Minor levels of aromatics found in light hydrocarbon products such as naphtha and kerosene are ineffective in providing clean separation of the emulsion in this process.

The emulsion and high-aromatic hydrocarbon blend is then subjected to a force of at least 500 g's provided by centrifugation or hydrocyclone equipment to separate the solids and the water from the clean oil. This results in recovery of oil that is at least 90 to 95% free of metals and other extraneous matter.

At the process start raw crude oil is mixed with about 1 to 15% water by volume, with 2 to 6% being preferred. Desalting chemicals, having an oil soluble and a water soluble component are also added at this time. A product such as Nalco 5551 supplied by Nalco Chemical Company is highly acceptable. Such agents supply anions which form water insoluble salts of sodium, potassium, magnesium, iron and other metals. Temperatures within the desalter chamber may range from about 120° to 280° F. with 150° to 250° being most preferred. Pressures of from about 40 to 200 psi within the chamber are operable, with 60 to 130 psi being a typical optimum.

Measurement of the extent of the emulsion layer between the oil and aqueous layers in the chamber is necessary to determine the rate at which some of the layer must be removed for treatment. While the swing arm embodiment has been discussed in detail other mechanical arrangements may be used. For example, multiple fixed ports can be vertically placed down the end wall of the desalting chamber. By taking samples through a series of such ports, the emulsion layer depth can be measured. Neutron backscatter or gamma ray instrumentation can also be used to measure the layer.

In practicing the critical step of blending aromatic-rich hydrocarbon into the interface emulsion after its withdrawal from the desalting chamber, an amount up to about 2 parts of hydrocarbon to 1 volume of emulsion is satisfactory. Greater amounts do not cause appreciably improved separation and are economically undesirable. Preferably, a 1:1 ratio is employed. A particularly desirable material is light catalytic cycle oil (LCCO) which is readily available in crude oil processing operations. A minimum of above 20% aromatic components by volume in the hydrocarbon is necessary for the practice of this invention. Useful materials also will have an API gravity of less than 40.

Aromatic content of the products is determined by nuclear magnetic resonance (NMR) determination of $sp^2$ orbital bonding.

Table I lists the gravity and aromatic levels of selected hydrocarbon products.

TABLE I

| Hydrocarbon | API Gravity | NMR Aromatic % |
|---|---|---|
| Naphtha | 60 | 15 |
| Kerosene | 35 | 15–20 |
| Light Catalytic Cycle Oil | 20 | 40–50 |

Such cycle oils also known as middle catalyst cycle oil, heavy catalyst cycle oil as well as LCCO have aromatic contents of from 20 up to 70%. Such hydrocarbons are highly useful in this step of the process. Naphtha and kerosene are unsuitable in providing clean separation so that less than 90% of metals present in the crude oil before desalting are removed.

A temperature of from about 100° to 300° F. is required for efficient breaking of the emulsion blend. A pressure of from 1 to 20 psi is also needed. Maintaining the pressure below 5 psi is optimum after withdrawal of the emulsion.

Equipment suitable to separate the emulsion blend as a final step of the basic process include centrifuges and hydrocyclones. While g forces of 500 to over 10,000 are operable, and a practical range for commonly available equipment is about 900 to 4,000, the usually preferred range is 1,500 to over 4,000. Values of 8,000 to 10,000 g produce excellent separation but maintenance costs increase when forces of this magnitude are used. Preferred separators yield three phases, i.e., water, oil and substantially dry solids. This three phase separation alleviates the problem of disposal of wastes and optimally yields clear water and oil containing less than 5% of the metals and particulates originally present in the raw crude oil.

The following example further illustrates aspects of the invention.

EXAMPLE 1

Fresh emulsion, less than four weeks old, was collected from a desalter assembly. It was mixed with an equal volume of light catalytic cycle oil having an NMR aromatic content of approximately 45% and 6 ppm of Nalco 5551 desalting chemical. The blend was hand mixed for 50 strokes and placed in a hot bath at 170° F. After reaching the temperature of the bath it was mixed again and the heated blend placed in a laboratory centrifuge generating a g force of about 3,000 for 2 minutes. Oil having less than 10% of the residual metal present in the emulsion was separated from the heavier phase.

Although embodiments of the invention have been shown and described, it is to be understood that various modifications and substitutions as well as various additions, rearrangements and combinations of process steps, can be made by those skilled in the art without departing from the novel spirit or scope of the invention.

What is claimed is:

1. A process for removing metals and insoluble materials from crude oil comprising the steps of:
   blending crude oil with water and desalting chemicals;
   charging the oil blend to a desalting chamber and passing it through an electrical field whereby agglomeration of suspended insoluble materials occurs and layers of clean oil, brine and oil-brine interface emulsion are formed;
   withdrawing the oil and brine;
   measuring the volume of the emulsion layer;
   withdrawing a portion of the emulsion layer;
   blending the withdrawn emulsion with up to 2 volumes of aromatic-rich hydrocarbon containing at least 20 percent aromatics by volume;
   maintaining the blend at a temperature of 100° to 300° F. and a positive pressure; and
   subjecting the blend to a force of at least about 500 g, whereby oil free of at least 90% of suspended particulates and water results.

2. The process of claim 1 wherein the aromatic-rich hydrocarbon volume is from 0.1 to 2 times the volume of the withdrawn emulsion layer.

3. The process of claim 1 in which the hydrocarbon is light catalytic cycle oil.

4. The process of claim 1 in which the pressure is 1 to 300 psi.

5. The process of claim 1 in which the g force is 900 to 10,000.

6. The process of claim 1 in which the g force is centrifugal.

7. The process of claim 6 wherein hydrocyclone g force is applied.

8. The process of claim 1 wherein the aromatic-rich hydrocarbon and emulsion are blended at a ratio of about 1:1 by volume.

* * * * *